United States Patent
Des Champs

(10) Patent No.: US 10,012,003 B1
(45) Date of Patent: Jul. 3, 2018

(54) SYSTEMS, DEVICES, AND/OR METHODS FOR MANAGING WATER-BORNE DEBRIS

(71) Applicant: Nicholas Howard Des Champs, Fincastle, VA (US)

(72) Inventor: Nicholas Howard Des Champs, Fincastle, VA (US)

(*) Notice: Subject to any disclaimer, the term of this patent is extended or adjusted under 35 U.S.C. 154(b) by 0 days.

(21) Appl. No.: 15/839,894

(22) Filed: Dec. 13, 2017

(51) Int. Cl.
*E04H 4/16* (2006.01)

(52) U.S. Cl.
CPC .................. *E04H 4/1609* (2013.01)

(58) Field of Classification Search
CPC .............. E04H 4/1609; B01D 29/0029; B01D 29/0036; B01D 29/0063
USPC ............ 210/167.17, 470, 471; 4/490; 15/1.7
See application file for complete search history.

(56) References Cited

U.S. PATENT DOCUMENTS

| | | | |
|---|---|---|---|
| 4,013,563 A * | 3/1977 | Petrik | E04H 4/1609 15/1.7 |
| 4,338,697 A * | 7/1982 | Broadwater | E04H 4/1609 15/1.7 |
| 4,481,117 A | 11/1984 | Collins | |
| 4,571,875 A | 2/1986 | Ballas | |
| 4,846,972 A | 7/1989 | Anderson | |
| 5,050,920 A | 9/1991 | Potticary | |
| 5,336,403 A * | 8/1994 | Marbach | E04H 4/1618 15/1.7 |
| D381,781 S | 7/1997 | Clay | |
| 5,858,221 A | 1/1999 | Conrad | |
| 5,915,431 A * | 6/1999 | Doussan | E04H 4/1609 15/1.7 |
| 5,926,891 A * | 7/1999 | Velasquez | E04H 4/1609 15/1.7 |
| 6,209,729 B1 | 4/2001 | Brouillard | |
| 6,368,502 B1 | 4/2002 | Resh | |
| 9,034,181 B1 | 5/2015 | Robinson | |
| 9,045,914 B2 | 6/2015 | Van Der Meijden et al. | |
| 2005/0087483 A1 | 4/2005 | Clay | |
| 2009/0250387 A1 | 10/2009 | Gonzalez | |
| 2011/0061357 A1 | 3/2011 | Rathjen | |
| 2014/0230172 A1 | 8/2014 | Resh | |
| 2017/0268251 A1 | 9/2017 | Fertic | |

* cited by examiner

*Primary Examiner* — Fred Prince
(74) *Attorney, Agent, or Firm* — Michael Haynes PLC; Michael N. Haynes

(57) ABSTRACT

Certain exemplary embodiments can provide a system, machine, device, configured for cleaning debris from water in a water container via a water cleaner that includes a handle, a collection net configured to collect debris resident in the water, and a frame configured to hold substantially open a primary inlet of the net.

22 Claims, 11 Drawing Sheets

1000

SYSTEMS, DEVICES, AND/OR METHODS FOR MANAGING WATER-BORNE DEBRIS

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which.

DESCRIPTION

Certain exemplary embodiments can provide a novel and inventive netted water cleaner, which can be used to remove water-borne and/or container-supported debris from a water container, such as from the water of a swimming pool, hot tub, fountain, fish pond, bird bath, fish tank, water garden, sump, collection basin, pond, stream, river, etc. With certain exemplary embodiments, there need be no necessity to move the water cleaner forward and backward along the floor of the body of water to agitate the debris or near the floor and then capture that debris within the attached net. Likewise, using certain exemplary embodiments, it can be unnecessary to agitate and/or lift the debris by pushing the collection blade over the debris, followed by pulling the cleaner back a foot or so, and then pushing the cleaner forward again to capture the agitated and lifted debris.

Instead, in a single pass, a smooth surfaced, foil-shaped, and/or hydrodynamic lift blade can substantially hydrodynamically (but not mechanically) agitate the debris, resulting in most, if not all, of that debris being caught and/or entrained in flow streams that pass over and/or under the hydrodynamic lift blade, over a collection blade, and into the net. Thus, by utilizing two blades, where the leading first blade hydrodynamically can agitate and/or lift the debris and the second blade can guide the agitated debris into the net, all in a single forward pass of the water cleaner, a more efficient and/or effective cleaning of the water can result.

One or more of these beneficial results can be accomplished by providing a hydrodynamic lift blade located in front of (relative to the direction of movement of the water cleaner) a debris collection blade of the water cleaner. The lift blade can be separated from and/or held off the floor by a gap measuring approximately 0.2 inches to approximately 2 inches (including all values and subranges therebetween), which can be created using one or more separators (e.g., sliders, rollers, spacers, etc.) typically positioned along and/or on one or both ends of the hydrodynamic lift blade and/or one or more arms via which the lift blade is attached to a net rim and/or frame of the water cleaner. This gap between the lowest portions of the lift blade and the floor can allow the lift blade to traverse the debris so that the fluid vortices created beneath, behind, and/or by the passing of the hydrodynamic lift blade can scrub and/or scour the floor and direct the agitated debris, via the vortexed and/or turbulent flow streams, into the debris collection net.

Figure 1:
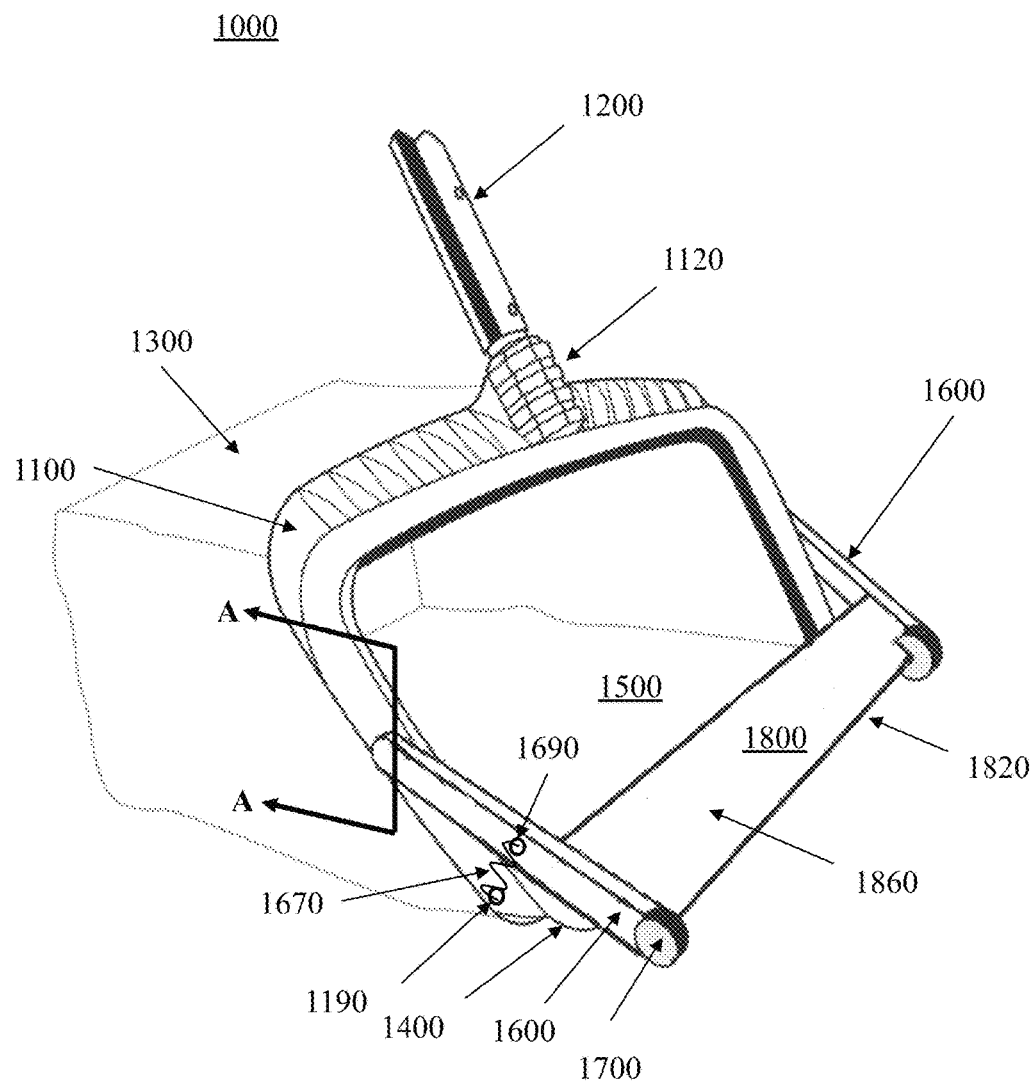
FIG. 1 is a perspective view of an exemplary water cleaner as it would appear in an operating mode.
Figure 2:
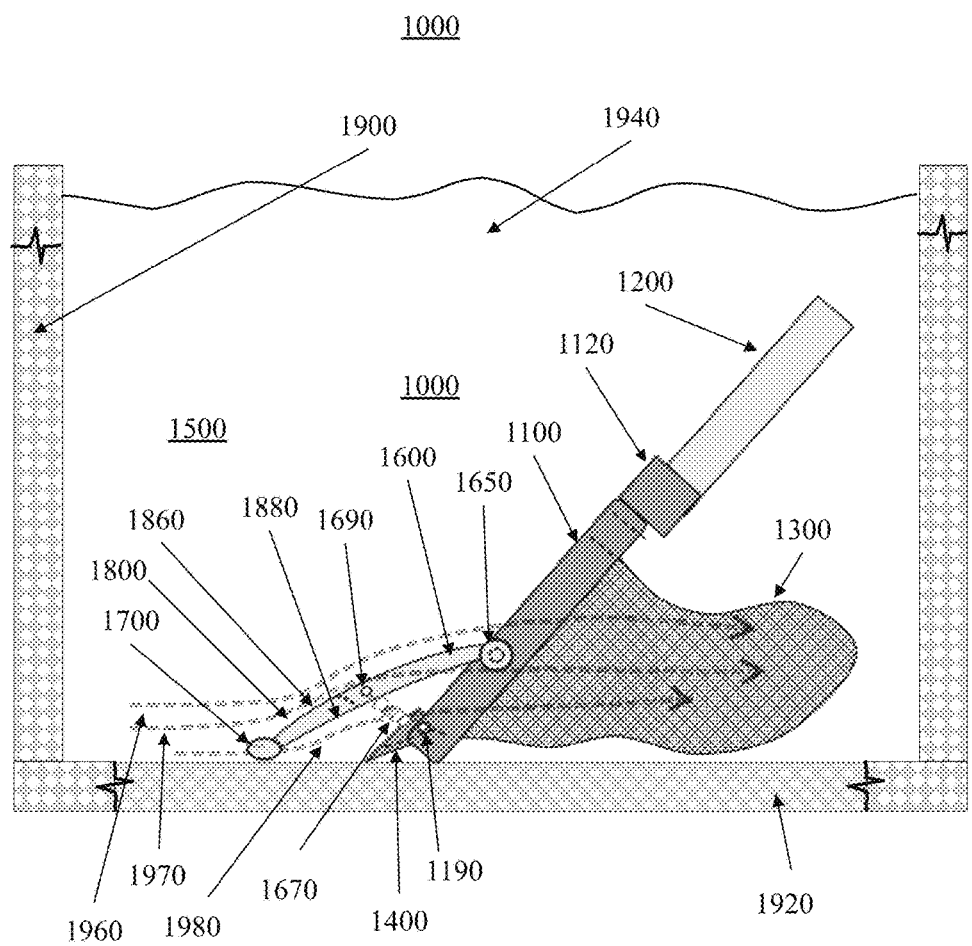
FIG. 2 is a side view of the exemplary water cleaner of FIG. 1 as it would appear in an operating mode.
Figure 3:
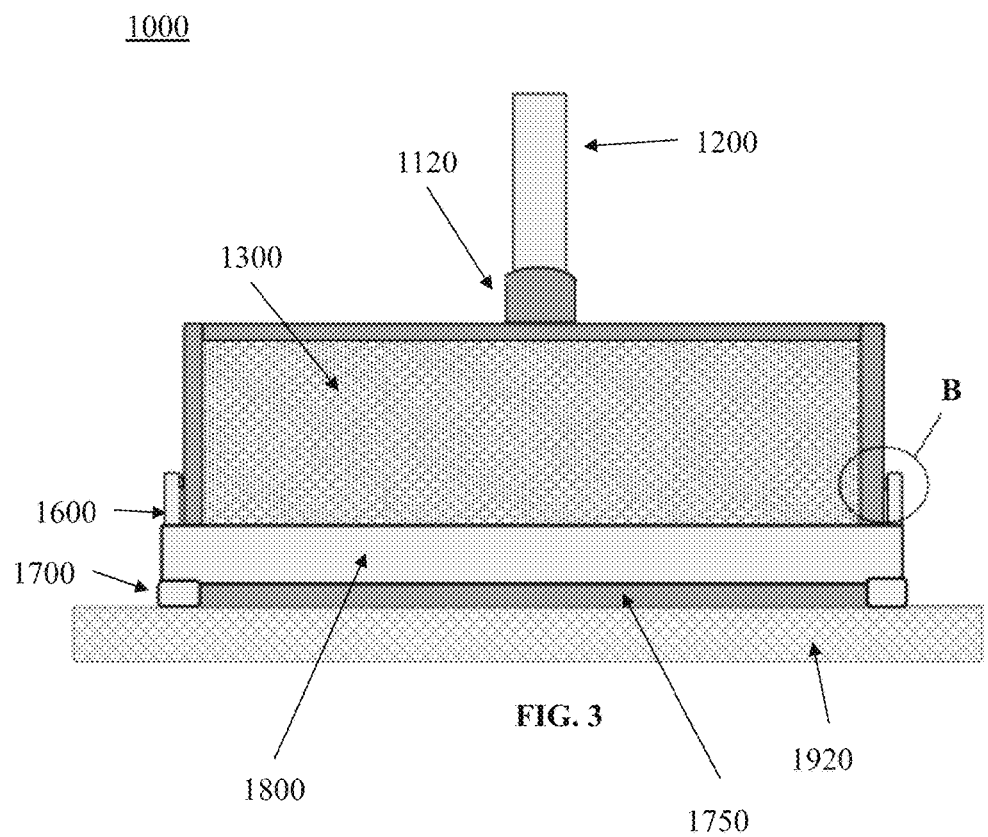
FIG. 3 is a front view of the exemplary water cleaner of FIG. 1 as it would appear in an operating mode.

FIGS. 1, 2, and 3 illustrate an exemplary water cleaner 1000. This exemplary embodiment can comprise a frame 1100 that can include a pole and/or handle mount 1120 configured to receive and/or attach to a pole and/or handle 1200. Frame 1100 can be generally rigid and/or can support and keep open the inlet to a mesh debris collection and/or containment net 1300. Attached or integral to frame 1100 can be a collection blade 1400 that can be configured to scrape along the bottom of a water container 1900 and/or act as a shovel and/or scoop to direct debris on the bottom and/or floor 1920 of water container 1900 into net 1300 as handle 1200 is held at approximately 15 to approximately 45 degree angle (including all values and sub-ranges therebetween) relative to floor 1920 while being pushed forward. A hydrodynamic lift blade assembly 1500 can include one or more pivot arms 1600, corresponding pivots 1650, one or more separators 1700, and/or a lift blade 1800. Pivot arm(s) can be integral to and/or rigidly attached to lift blade 1800. A substantially resilient biaser 1670 (such as a rubber band; elastic frame, ball, chain, band, strip, cord, thread, and/or string; shape memory device; tension and/or extension spring; compression spring; helical spring; spiral spring; torsion spring; constant force spring; leaf spring; spring clip; paired magnets, gas-filled and/or pneumatic ball, bladder, and/or container; bowstring, etc.) that is configured to bias at least one pivot arm 1600 toward frame 1100 and/or that can connect to frame port 1190 and arm port 1690.

After hydrodynamic lift blade assembly 1500 is connected to frame 1100, tension springs 1670 can be connected between frame port 1190 and arm port 1690.

FIG. 2 illustrates how net-bound flow streams 1960, 1970, and/or 1980 can be created and/or altered when water cleaner moves toward the left in FIG. 2 in a way that allows debris to rise from floor 1920, over collection blade 1400, which can be the leading part of frame 1100, and through the inlet to net 1300, such that the debris is trapped in net 1300. Also shown in FIG. 2 a manner in which the swing arms 1600 can rotate about pivot 1650, allowing separators 1700, with the aid of the one or more tension springs 1670, to hold the leading edge 1820 of lift blade 1800 at a fixed distance above and away from floor 1920. The fixed distance, space, and/or gap 1750 (best seen in FIG. 3) between floor 1920 and leading edge 1820 of lift blade 1800 can be on the order of from approximately 0.2 inches to 2 inches, including all values and subranges therebetween, such as approximately 0.33, 0.4721, 0.50, 0.625, 0.768, 0.98, 1.25, 1.512, 1.8, etc. inches.

As shown in FIG. 3, one or more continuous, uninterrupted gaps 1750 can extend unimpeded for a substantial portion of the length of lift blade 1800, such as for approximately 33 percent to approximately 100 percent of the length of lift blade 1800, including all values and sub-ranges therebetween, e.g., approximately any of 42.15, 50, 66.7, 80.1, 90, 95.25, etc. percent. Such a wide and uninterrupted gap can allow pieces of debris that are not as wide and not as tall as gap 1750 (with respect to the dimensions of gap 1750) to fit through gap 1750 and beneath lift blade 1800 as those pieces of debris are entrained in flow stream 1980, which itself can span the width of gap 1750. That is, any of many, a majority of, and/or substantially all pieces of debris can become entrained in and move along in flow stream 1980 beneath lift blade 1800 without contacting lift blade 1800 and/or water cleaner 1000. Substantially unimpeded movement of debris below and/or over lift blade 1800 can be further facilitated by providing a substantially smooth bottom surface 1880 and/or top surface 1860 on lift blade 1180. Thus, the dimensions of gap(s) 1750, the shape and/or orientation of lift blade 1800, and/or the surface finish of lift blade 1800 can substantially lower the likelihood of (and in many cases completely avoid) direct physical contact between a given piece of debris and lift blade 1800 (i.e., the debris touching lift blade 1800), and therefore can substantially lower the likelihood of (and in many cases completely avoid) direct momentum transfer from lift blade 1800 to the debris. Avoiding physical contact between debris and lift blade 1800, separator(s) 1700, and/or water cleaner 1000 can lower the effort needed to cause the debris to flow passed lift blade 1800 and into net 1300. Also, minimizing and/or avoiding physical contact between floor 1920 and lift blade 1800, separator(s) 1700, and/or water cleaner 1000 can lower the effort needed to move water cleaner 1000 over a given portion of floor 1920. Moreover, avoiding contact between debris and lift blade 1800, separator(s) 1700, and/or water cleaner 1000 can facilitate agitating, lifting, and/or entraining substantially all debris that can fit through gap 1750 and/or beneath water cleaner 1000 without requiring multiple passes of water cleaner 1000 over that debris and/or the corresponding portion of floor 1920. This can be particularly helpful when debris is relatively small, such as with sand and similarly sized organic matter, which might otherwise require numerous passes and/or vacuuming floor 1920. Debris having dimensions that are larger than those of gap 1750 can become entrained in flow stream 1970 and/or flow stream 1960 and thereby flow above lift blade 1800 and into net 1300. Likewise, debris that is not in contact with floor 1920 at the time water cleaner 1000 approaches can become entrained in flow stream 1970 and/or flow stream 1960 and thereby flow above lift blade 1800 and into net 1300. In the event debris becomes caught on lift blade 1800, such as by wrapping partially around lift blade 1800 and extending into and/or through gap 1750 and over lift blade 1800, or becomes caught on a separator 1700, the lack of hydrodynamically unfriendly flow impediments (e.g. protrusions and/or bristles) on the surfaces of lift blade 1800 can allow for relatively easy removal of that debris.

This magnitude of clearance height and/or gap 1750 can allow most debris resting on floor 1920 to remain stationary until hydrodynamic lift blade 1800 passes directly vertically over. Once blade 1800 traverses the debris, one or more vortices and/or eddies of turbulence can be created by the negative pressure directly under and behind blade 1800, which can scrub and/or scour floor 1920.

Figure 4:
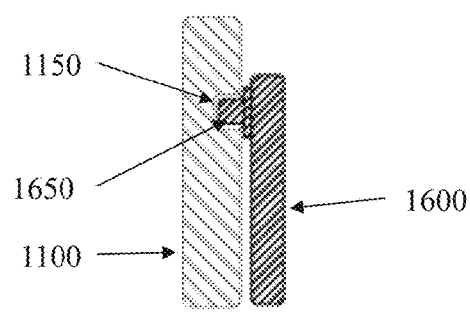
FIG. 4 is an magnified view of detail B of FIG. 4.

As seen in FIG. 4, which magnifies detail B from FIG. 3, hydrodynamic lift blade assembly 1500 can be attached to frame 1100 by spreading the ends of pivot arms 1600 outward (at pivots 1650), and allowing the placement of pivots 1650, which can be cylindrical protrusions from pivot arms 1600 and/or can be integral to pivot arms 1600, to be contained within pivot receivers 1150, which can be recesses in frame 1100. Note that frame 1100 can provide any number of pivot receivers 1150 and/or corresponding pairs of pivot receivers, which can allow for varying the mounting height of hydrodynamic lift blade assembly 1500 with respect to frame 1100, collection blade 1400, and/or floor 1920. Pivots 1650 can utilize set screws that can non-destructably releaseably connect hydrodynamic lift blade assembly 1500 and/or pivot arms 1600 to any desired location on the sides of frame 1100, thereby allowing for (potentially in combination with separators of a variety of heights) the ability to vary as desired the height of gap 1750, the attack angle of hydrodynamic lift blade 1800, and/or the restoring force operating on hydrodynamic lift blade assembly 1500. Arms 1600 (or 1610 or 1620—see FIGS. 9-15) can be adjustable in length to allow hydrodynamic lift blade 1800 to extend further out in front of frame 1100. Hydrodynamic lift blade 1800 can be adjustable in its angle of attack, such as by connecting it to arms 1600 via screws, which potentially have their heads located over washers. Multiple hydrodynamic lift blades 1800 can be employed as desired to obtain the desired flow pattern(s). Having the ability to adjust the distance between hydrodynamic lift blade 1800 and frame 1100, the angle of attack of hydrodynamic lift blade 1800, and the number of hydrodynamic lift blades 1800 can allow for ease of debris collection in variable depths of water, via people having variable strength, and/or using variations in the speed of forward movement of pole 1200.

Figure 5:
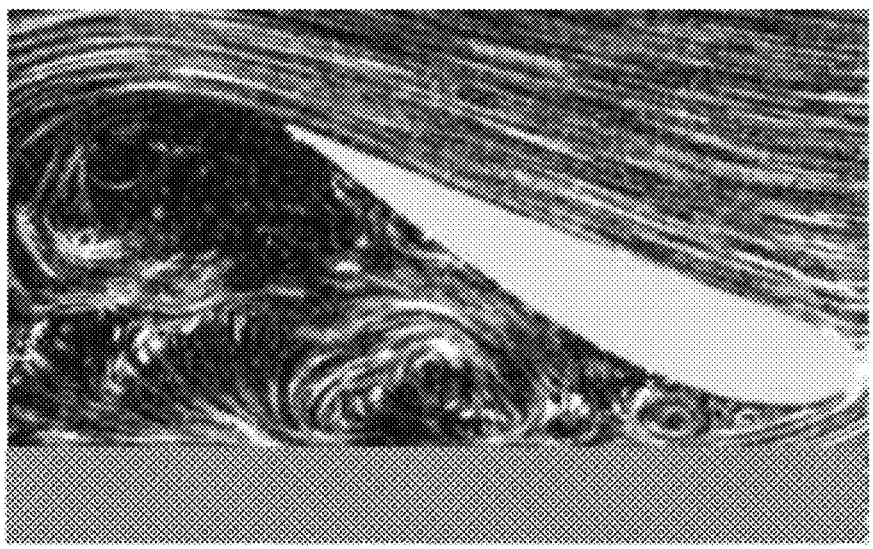
FIG. 5 is a photo showing flow over and under an exemplary hydrodynamic lift blade when in a stall orientation.
Figure 6:
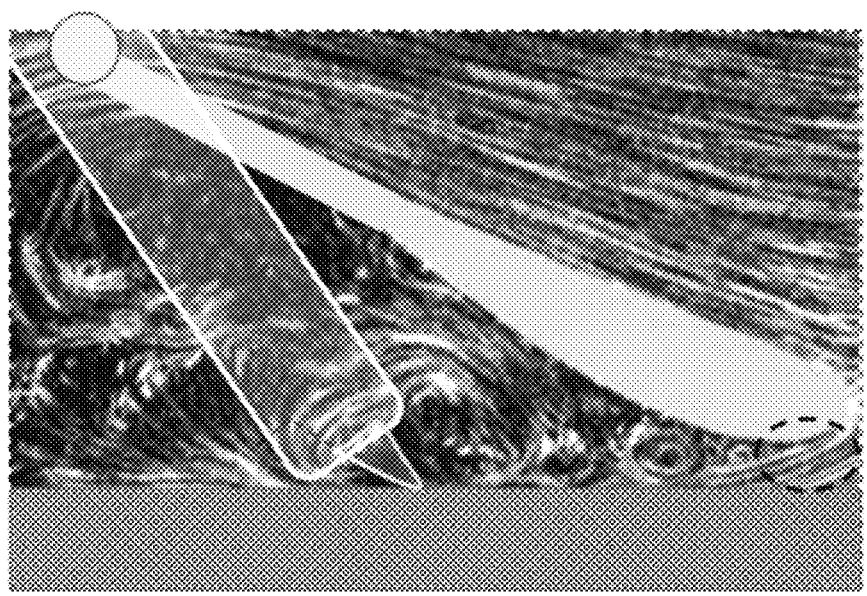
FIG. 6 is the photo of FIG. 5 overlaid by an illustration of a portion of an exemplary water cleaner.

FIG. 5 is a photograph that illustrates the hydrodynamic flow around an foil-shaped, relatively smooth-surfaced blade when the blade has an angle of attack of approximately 30 degrees to the direction of flow (which is from right to left in FIG. 5 and FIG. 6). The low pressure zone created beneath and/or behind the blade can cause water to be lifted from the floor to fill the low pressure zone, creating vortices, eddies, and/or turbulence. FIG. 6 is the photograph of FIG. 5 over which a drawing of a lower portion of an exemplary water cleaner has been placed. Notice how, when the lift blade is properly designed relative to the collection blade and collection net, the turbulence generated when moving the lift blade over the floor (from left to right in this figure) can scrub and/or scour the floor and the vortex motion of that turbulence can direct the dislodged debris into the net. The tension spring can allow the pivot arm(s) the flexibility to position themselves so that both the collection blade, which can be an integral part of the frame, and the hydrodynamic lift blade can be constantly in the optimum position relative to the floor for maximum effectiveness. When not in use the tension springs can hold the pivot arm(s) and/or lift blade against the frame (shown in FIG. 8).

Figure 7:
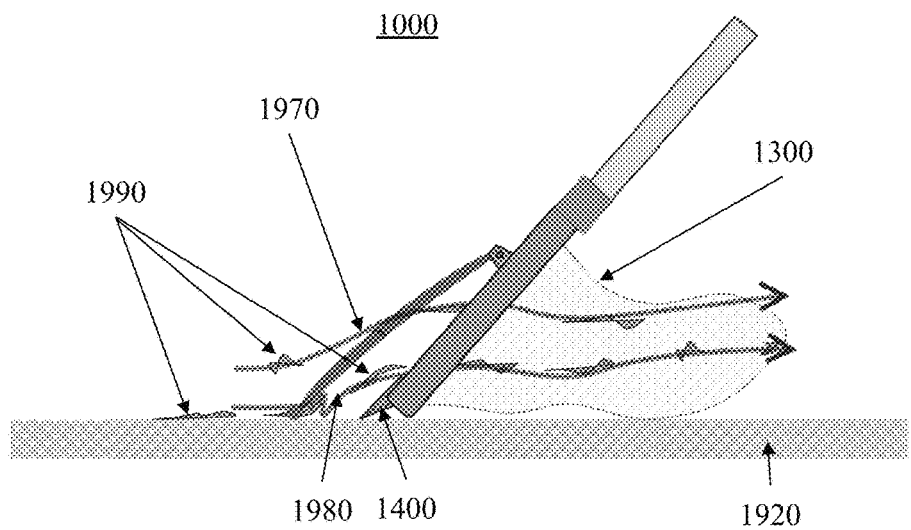
FIG. 7 is an side view of an exemplary water cleaner as it would appear in an operating mode, with debris entrained in a first flow stream that passes along and/or above the top surface of the hydrodynamic lift blade and with debris entrained in a second flow stream that passes along and/or below a lower surface of the hydrodynamic lift blade.

As shown in FIG. 7, an overall flow pattern (combination of flow streams) that can cause the disturbance and flow of debris 1990 as intended can be the result of the negative pressure pattern that can develop under a hydrodynamic lift blade when the angle of attack reaches a critical value. For angles of attack above this critical value, a flow stream 1980 that flows below, adjacent, and/or in contact with bottom, lower, and/or under surface 1880 of lift blade 1800 and can begin to vortex. The condition is shown in FIG. 7, which illustrates the vortices, eddies, and/or turbulence that arises in flow stream 1980.

Figure 8:
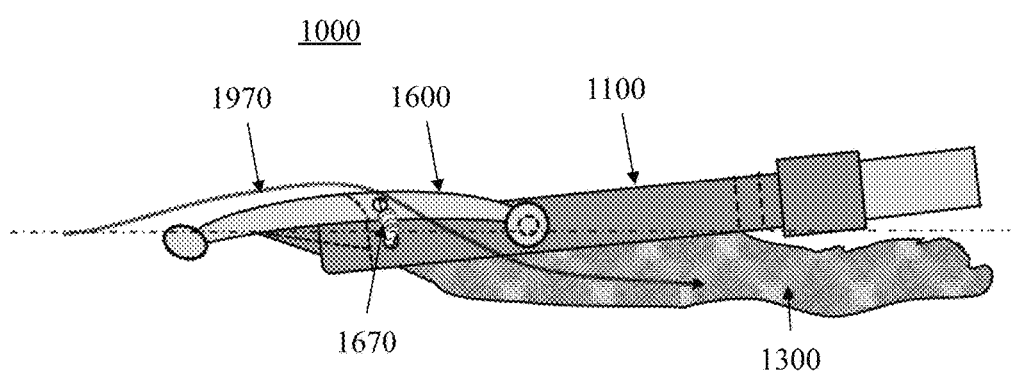
FIG. 8 is a side view of an exemplary embodiment of a water cleaner being used as a surface skimmer to gather floating debris from the surface of a water container.

FIG. 8 shows an exemplary water cleaner 1000 when it is being used to skim leaves off the surface of the water container, or for use to collect suspended debris within the water container. Note that in these cases, the tension spring(s) 1670 can retract the pivot arm(s) 1600 and/or lift blade 1800 down and against frame 1100. Also note that the entire entry to net 1300 can be and/or remain open to accept debris and/or to dump debris from net 1300.

Figure 9:
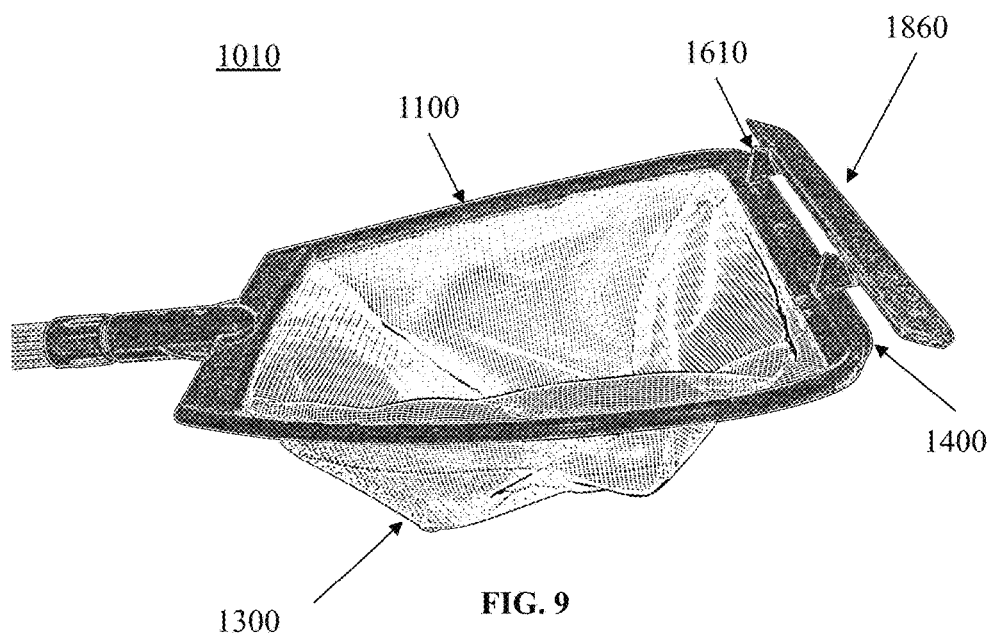
FIG. 9 is a top perspective view of an exemplary embodiment of a water cleaner having a lift blade that is connected to the frame of the water cleaner via fixed arms.
Figure 10:
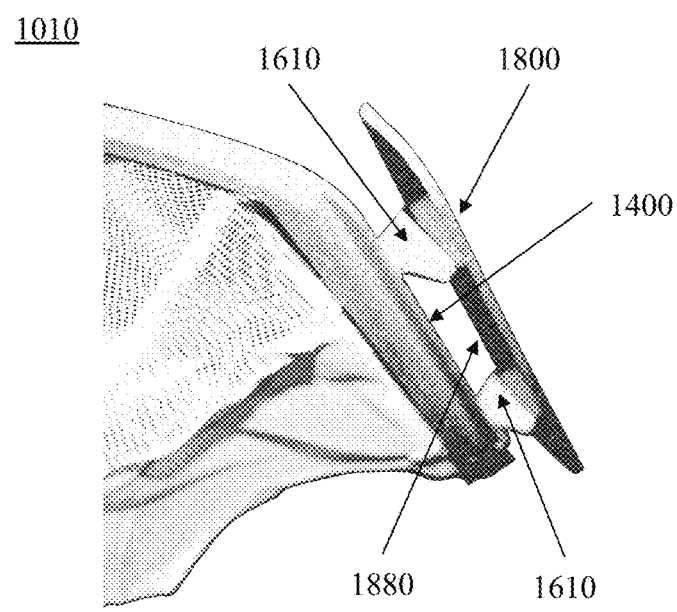
FIG. 10 is a bottom perspective view of an exemplary embodiment of a water cleaner 1010 having a lift blade that is connected to the frame of the water cleaner via fixed arms.

FIG. 9, FIG. 10, FIG. 11, and FIG. 12 show an alternative embodiment 1010 of water cleaner 1000, with similar parts labeled similarly. More particularly, FIG. 9 and FIG. 10 show, respectively, a top perspective view and bottom perspective view of alternative water cleaner 1010, which utilizes the hydrodynamic principal via lift blade 1800 in a fixed positional and/or angular relationship to collection blade 1400, such that the effective angle of lift blade 1800 can be a function of the angle of the longitudinal axis of handle 1200 to floor 1920. That is, with this alternative water cleaner 1010, the at least partially rotatable pivot arm(s) of water cleaner 1000 can be replaced with fixed arms 1610, which can be integral or attached to lift blade 1800, integral or attached to frame 1100, fixedly or non-destructably removable from frame 1100, and/or need not operatively provide for relative translation and/or relative rotation between lift blade 1800 and frame 1100.

Figure 11:
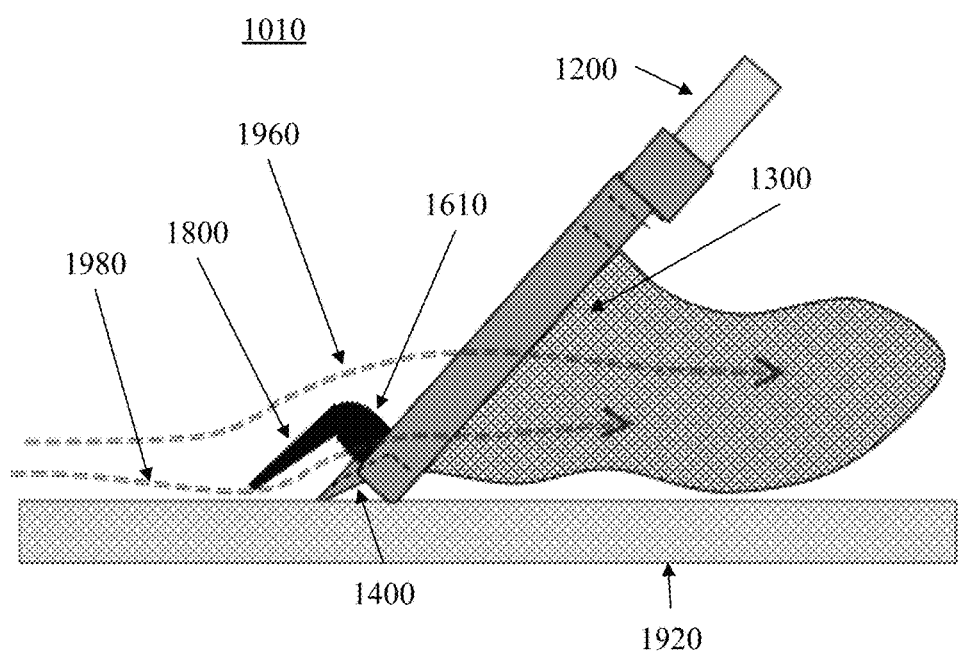
FIG. 11 is a side view of the exemplary water cleaner of FIG. 10 as it would appear in an operating mode.

As can be seen in FIG. 11, because collection blade 1400 and hydrodynamic lift blade 1800 operatively can be continually fixed in position relative to one another, and because separator 1700 is not provided, the height of gap 1750 can be substantially dependent on the angle of handle 1200 relative to floor 1920 and/or on the height of lift blade relative to the height of collection blade 1400. Thus, it is possible with this embodiment for lift blade to contact floor 1920. Consequently, the performance of lift blade 1800 can directly depend on such blade heights and/or the angle of handle 1200 when water cleaner 1010 is in use. Nevertheless, even without the use of separators, separation between lift blade 1800 and floor 1920 can be sufficient to provide an adequate overall flow pattern, flow stream 1980, and/or flow stream 1960. This can be accomplished in many typical operational situations by making collection blade 1400 extend sufficiently lower than lift blade 1800 that gap 1750 is very likely to exist, and with a height sufficient to create the desired agitation, lift, and/or effects (e.g. laminar flow, turbulent flow, etc.) in the overall flow pattern, flow stream 1980, and/or flow stream 1960.

Figure 12:
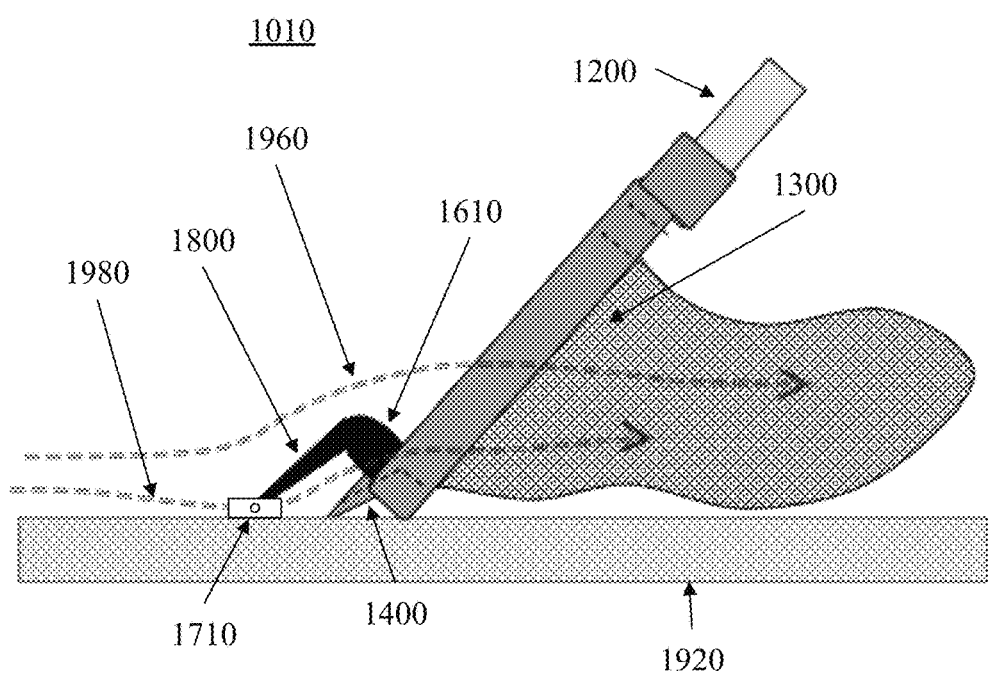
FIG. 12 is a side view of an exemplary water cleaner.

As illustrated in FIG. 12, this potential limitation can be mitigated to some extent by providing one or more separators 1710 to help maintain a desired height of gap 1750 and/or to avoid contact between lift blade 1800 and floor 1920. Separator(s) 1710 can be integral and/or attached (e.g., fixedly, non-destructively releaseably, and/or pivotably, etc.) to lift blade 1800. As with separator(s) 1700, separator(s) 1710 can be relatively small in width compared to the width of lift blade 1800, potentially allowing one or more gaps 1750 to extend unimpeded for a substantial portion of the length of lift blade 1800, such as for approximately 33 percent to approximately 100 percent of the length of lift blade 1800, including all values and sub-ranges therebetween, e.g., approximately any of 42.15, 50, 66.7, 80.1, 90, 95.25, etc. percent. Heightwise, even when handle 1200 is angled with respect to floor 1920, separator(s) 1710 can extend vertically to a position below the bottom-most point of lift blade 1800.

Figure 13:
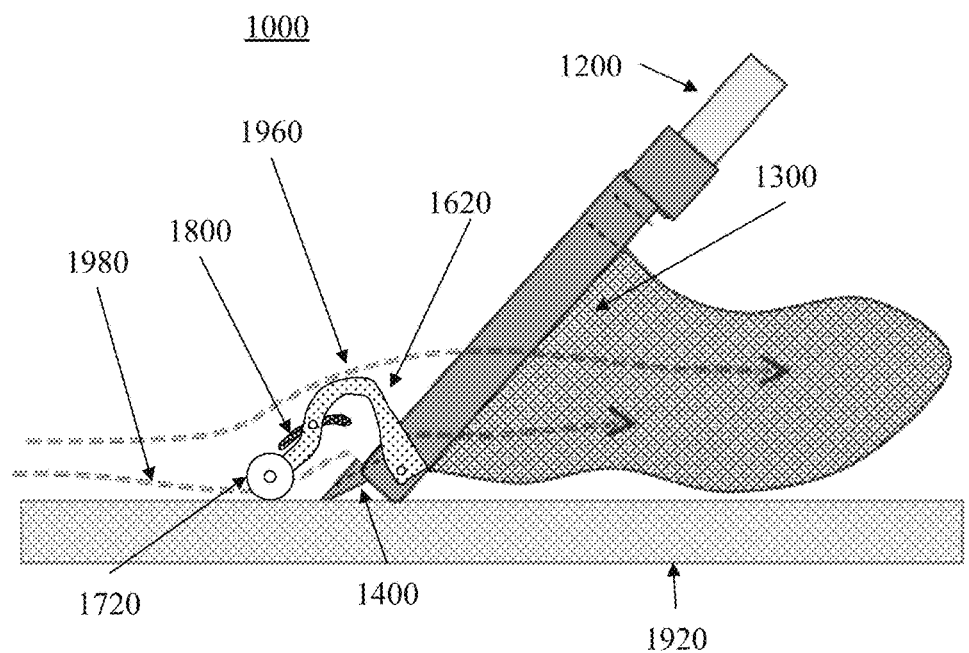
FIG. 13 is a side view of an exemplary water cleaner.

As illustrated in FIG. 13, pivot arms 1600 of FIG. 2 and fixed arms 1610 of FIG. 11 are replaced with one or more resilient arms 1620, which can be formed from a shape memory material and which can function to keep separator 1720 pressed firmly against floor 1920 when water cleaner 1000 is in operation. Resilient arm(s) 1620 can be attached to frame 1100 fixedly, non-destructively releaseably, and/or pivotably, etc. Similarly, lift blade 1800 can be attached to resilient arm(s) 1620 fixedly, non-destructively releaseably, and/or rotateably, etc. Likewise, separator(s) 1720 can be coupled to lift blade 1800 fixedly, non-destructively releaseably, and/or rotateably, etc. Note that by using one or more resilient arms 1620, biaser 1670 of FIG. 2 can be eliminated, however arms 1620 might not retract as far as the pivotable arms 1600 of FIG. 2. Note also that because resilient arms 1620 can keep separator 1720 pressed firmly against floor 1920 when water cleaner 1000 is in operation, resilient arms 1620 can help ensure that lift blade 1800 does not contact floor 1920 and/or that gap 1750 maintains a height sufficient for debris to operatively pass under lift blade 1800.

Figure 14:
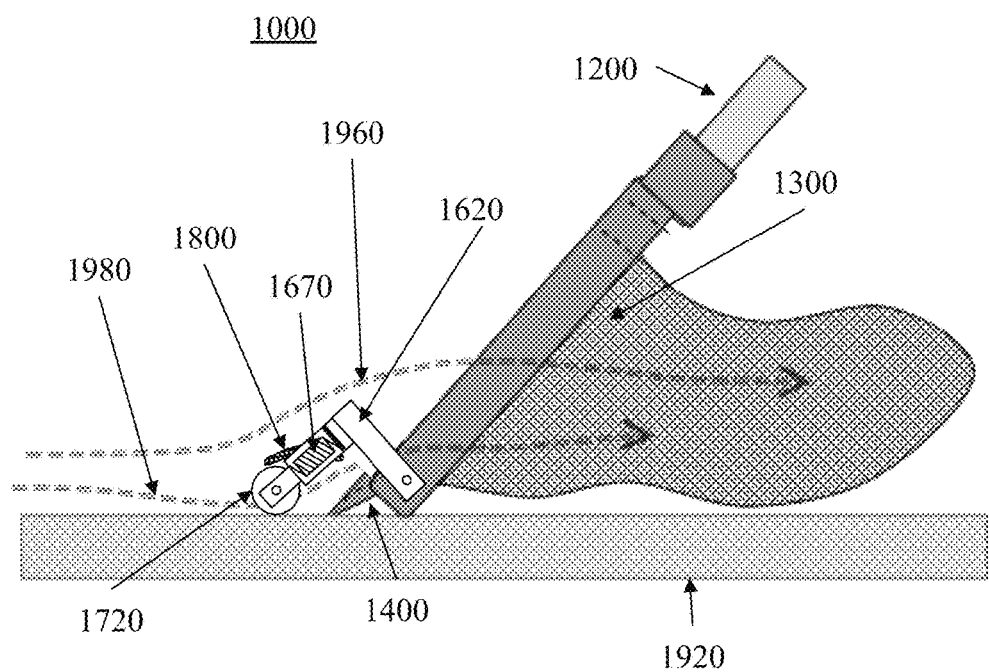
FIG. 14 is a side view of an exemplary water cleaner.
Figure 15:
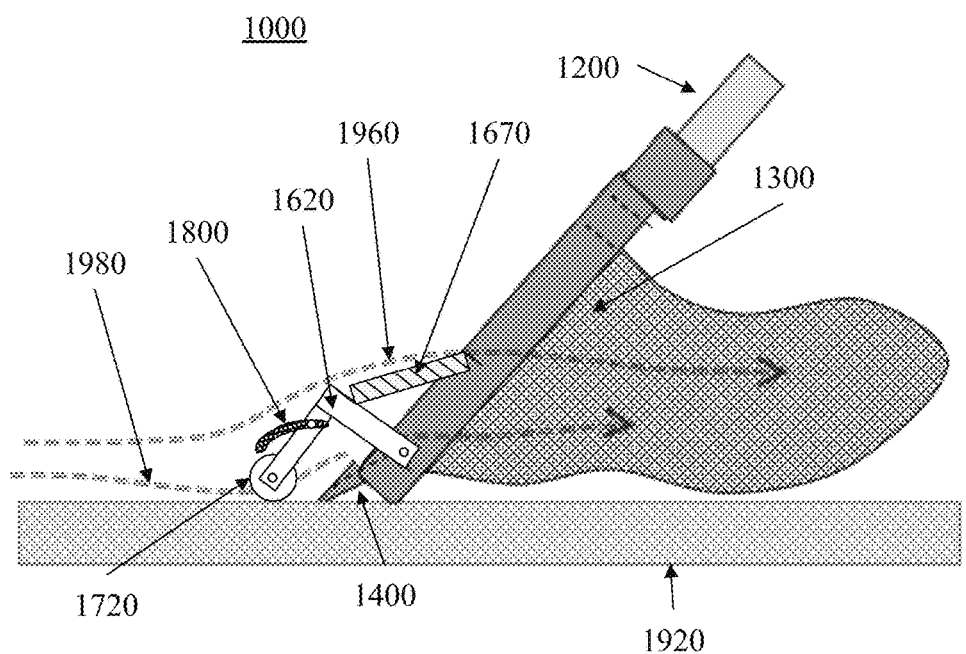
FIG. 15 is a side view of an exemplary water cleaner.

A different embodiment of resilient arm(s) 1620 is illustrated in FIG. 14. In this embodiment, resilient arm(s) 1620 can comprise one or more rigid arm members and an integral and/or interior resilient biaser 1670, such as a compression spring or a coil spring, that helps keep separator 1720 pressed firmly against floor 1920 when water cleaner 1000 is in operation. Likewise, FIG. 15 illustrates an external biaser connected to a one or more fixed arms 1610. In each of these embodiments, rather than the entirety of the arm(s) assembly being formed from a resilient material, a biaser can be integral to, internal to, and/or attached externally to an arm member to provide the desired restoring force that can help keep lift separator pressed firmly against floor 1920 and/or can help keep gap 1750 within a desired height range.

In various embodiments, resilient arm(s) 1620 can be attached to frame 1100 fixedly, pivotably, rotateably, slideably, non-destructively releaseably, etc. Similarly, lift blade 1800 can be attached to resilient arm(s) 1620 fixedly, pivotably, rotateably, slideably, non-destructively releaseably, etc. Likewise, separator(s) 1720 can be coupled to lift blade 1800 fixedly, pivotably, rotateably, slideably, non-destructively releaseably, etc. Note that by using one or more resilient arms 1620, biaser 1670 of FIG. 2 and/or FIG. 15 can be eliminated, however arms 1620 might not retract as far as the arm(s) 1600 of FIG. 2 and/or arm(s) 1620 of FIG. 15. Note also that arm(s) 1600 and/or 1620 can keep separator 1700, 1710, and/or 1720 pressed firmly against floor 1920 when water cleaner 1000 is in operation, arm(s) 1600 and/or 1620 can help ensure that lift blade 1800 does not contact floor 1920 and/or that gap 1750 maintains a height sufficient for debris to operatively pass under lift blade 1800.

As with separator(s) 1700, separator(s) 1710 and/or 1720 can be relatively small in width compared to the width of lift blade 1800, potentially allowing one or more gaps 1750 to extend unimpeded for a substantial portion of the length of lift blade 1800, such as for approximately 33 percent to approximately 100 percent of the length of lift blade 1800, including all values and sub-ranges therebetween, e.g., approximately any of 42.15, 50, 60, 66.7, 80.1, 90, 95.25, etc. percent. Heightwise, even when handle 1200 is angled with respect to floor 1920, separator(s) 1710 and/or 1720 can extend vertically to a position below the bottom-most point of lift blade 1800.

Certain exemplary embodiments can provide a water cleaner, comprising:

a handle;
a collection net configured to operatively collect debris resident in water of a water container;
a frame configured to attach to the handle and to operatively and substantially hold open a major inlet of the net;
a collection blade integral to or attached to a bottom edge of the frame, the collection blade configured to operatively traverse along and/or adjacent to a floor of the water container; and/or
a hydrodynamic assembly configured to be attached to the frame, the lift assembly comprising:
  an elongated hydrodynamic lift blade that defines a hydrodynamic lift blade longitudinal axis, a length, a substantially smooth upper surface, and/or a substantially smooth lower surface;
  at least one arm configured to operatively attach the hydrodynamic lift blade to the frame, the water cleaner configured to operatively resiliently bias the hydrodynamic lift blade toward the floor; and/or
  the water cleaner configured to operatively define a gap between the hydrodynamic lift blade and the floor, the gap extending uninterrupted for at least 50 percent of the length of the hydrodynamic lift blade;
further comprising:
  at least one separator configured to operatively contact the floor of the water container;
  at least one separator configured to operatively slide along the floor of the water container; and/or
  at least one separator configured to operatively roll along the floor of the water container;
wherein:
  the hydrodynamic lift blade is configured to cause substantially turbulent flow in a flow stream that passes substantially below the hydrodynamic lift blade when the water cleaner moves in a direction that is substantially parallel to a plane of the floor of the water container;
  the hydrodynamic lift blade is configured to maintain substantially laminar flow in a flow stream that passes substantially above the hydrodynamic lift blade when the water cleaner moves in a direction that is substantially parallel to a plane of the floor of the water container;
  the hydrodynamic lift blade is configured to operatively entrain in a net-bound flow stream debris resting on the floor of the water container without touching that debris;
  the hydrodynamic lift blade is configured to operatively direct debris into the collection net without touching that debris;
  the collection blade is configured to substantially prevent debris entrain in a net-bound flow stream by the hydrodynamic lift blade from flowing under the net when the water cleaner moves in a direction that is substantially parallel to a plane of the floor of the water container;
  the hydrodynamic assembly is configured to non-destructively removeably attach to the frame;
  the at least one pivot arm is configured to non-destructively releaseably attach to the frame;
  a longitudinal cross-section of the hydrodynamic lift blade is hydrofoil-shaped;
  the at least one separator is integral to or attached to the at least one pivot arm;
  the at least one separator is integral to or attached to the hydrodynamic lift blade;
  the water cleaner operatively biases the hydrodynamic lift blade toward the frame; and/or
  a position of the hydrodynamic lift blade with respect to the collection blade is operatively variable.

Certain exemplary embodiments can provide a water cleaner, comprising:
a handle;
a collection net configured to operatively collect debris resident in water of a water container;
a frame configured to attach to the handle and to operatively hold substantially open a primary inlet of the net;
a collection blade integral to or attached to a bottom edge of the frame, the collection blade configured to operatively traverse along and/or adjacent to a floor of the water container; and/or
a hydrodynamic lift assembly configured to be attached to the frame, the hydrodynamic lift assembly comprising:
  an elongated hydrodynamic lift blade that defines a hydrodynamic lift blade longitudinal axis;
  at least one arm configured to operatively attach the hydrodynamic lift blade to the frame; and/or
  at least one separator configured to operatively prevent direct contact between the hydrodynamic lift blade and the floor and between the hydrodynamic lift blade and debris supported by the floor;
wherein:
  the hydrodynamic lift blade is configured to operatively cause substantially turbulent flow in a flow stream that passes substantially below the hydrodynamic lift blade when the water cleaner moves in a direction that is substantially parallel to a plane of the floor of the water container;
  the at least one arm is configured to operatively remain in a fixed position with respect to the frame; and/or
  the hydrodynamic lift blade is configured to operatively remain in a fixed position with respect to the frame.

Certain exemplary embodiments can provide a water debris entrainment assembly configured to be attached to a frame of a net device that is configured to collect debris from water in a water container, the net device comprising a collection blade configured to scrape a floor of the water container, the assembly comprising an elongated hydrodynamic lift blade that defines a hydrodynamic lift blade longitudinal axis, the hydrodynamic lift blade operatively configured to:
  be located forward of the collection blade with respect to operative movement of the net device;
  define an uninterrupted gap between itself and the floor of at least 0.2 inches along at least 70% of the length of hydrodynamic lift blade when the collection blade is in contact with the floor;
  direct debris into the collection net without touching that debris; and/or
  simultaneously cause, when the collection blade is in contact with and moves along the floor, substantially turbulent flow in a first flow stream that passes below the hydrodynamic lift blade and substantially laminar flow in a second flow stream that passes above an upper surface of the hydrodynamic lift blade.

Definitions

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
about—around and/or approximately.
above—over, at a higher level and/or place, and/or on top of.
across—from one side to another.
activity—an action, act, step, and/or process or portion thereof.
adapt—to design, make, set up, arrange, shape, configure, and/or make suitable and/or fit for a specific purpose, function, use, and/or situation.
adapter—a device used to effect operative compatibility between different parts of one or more pieces of an apparatus or system.
adjacent—close to; lying near; next to; adjoining, and/or within a horizontal radius of approximately 0.2 to approximately 2 inches of, including all values and subranges therebetween.
after—following in time and/or subsequent to.
agitate—to upset, disturb, shake, and/or stir and/or to cause to move vigorously.
agitator—a device configured to upset, disturb, shake, scour, and/or stir and/or to cause to move vigorously.
along—through, on, beside, over, in line with, in contact with, and/or parallel to the length and/or direction of; and/or from one end to the other of.
and—in conjunction with.
and/or—either in conjunction with or in alternative to.
any—one, some, every, and/or all without specification.
apparatus—an appliance or device for a particular purpose.
approximately—about and/or nearly the same as.
arm—an elongated structural member, which need not be solely linear.
around—about, surrounding, and/or on substantially all sides of; and/or approximately.
as long as—if and/or since.
assembly—a plurality of coupled components; and/or a group of parts forming a self-contained, independently mounted unit.
associate—to join, connect together, and/or relate.
at—in, on, and/or near.
at least—not less than, and possibly more than.
attach—to fasten, secure, couple, and/or join.
axis—a straight line about which a body and/or geometric object rotates and/or can be conceived to rotate and/or a center line to which parts of a structure and/or body can be referred.
based on—indicating one or more factors that affect a determination, but not necessarily foreclosing additional factors that might affect that determination.
be—to exist in actuality.
below—beneath; in a lower place; and/or less than.
between—in a separating interval and/or intermediate to.
bias—to urge in a direction.
blade—a foil and/or a relatively thin rigid arm having flat or sometimes curved surfaces, which is moved by and/or used to cause motion in a fluid.
bottom—a lowest part of an object relative to a point of reference, the object in a predetermined orientation relative to the point of reference.
bound—going toward, heading toward, and/or on a certain path toward.
by—via and/or with the use and/or help of
can—is capable of, in at least some embodiments.
cause—to bring about, provoke, precipitate, produce, elicit, be the reason for, result in, and/or effect.
cause—to bring about, provoke, precipitate, produce, elicit, be the reason for, result in, and/or effect.
circuit—an electrically conductive pathway and/or a communications connection established across two or more switching devices comprised by a network and between corresponding end systems connected to, but not comprised by the network.
cleaning—the dislodging of extraneous matter and/or debris.
collect—to accumulate and/or gather.
composition of matter—a combination, reaction product, compound, mixture, formulation, material, and/or composite formed by a human and/or automation from two or more substances and/or elements.
comprising—including but not limited to, what follows.
configure—to design, arrange, set up, shape, and/or make suitable and/or fit for a specific purpose, function, use, and/or situation.
configured to—designed, arranged, set up, shaped, and/or made suitable and/or fit for a specific purpose, function, use, and/or situation, and/or having a structure that, during operation, will perform the indicated activity(ies). To the extent relevant to the current application, the use of "configured to" is expressly not intended to invoke 35 U.S.C. § 112(f) for that structure.
connect—to join or fasten together.
constrain—to restrict, limit, regulate, and/or restrain within bounds.
contact—to touch and/or come together.
containing—including but not limited to.
convert—to transform, adapt, and/or change.
corresponding—related, associated, accompanying, similar in purpose and/or position, conforming in every respect, and/or equivalent and/or agreeing in amount, quantity, magnitude, quality, and/or degree.
coupleable—capable of being joined, connected, and/or linked together.
coupling—linking in some fashion.
create—to bring into being.
cross-section—a section formed by a plane cutting through an object at a right angle to an axis.
debris—an undissolved extraneous solid substance present in the water of a water container but not attached to the water container, such as something submerged, floating on the surface, or supported by the bottom of the container, e.g., leaves, seeds, blooms, stems, sticks, clippings, mulch, water plants, algae, worms, insects, crustaceans, minnows, small animals, remains, food waste, organic matter, gravel, sand, fishing lures, toys, jewelry, and/or trash, etc.
define—to establish the meaning, relationship, outline, form, and/or structure of; and/or to precisely and/or distinctly describe and/or specify.
derive—to receive, obtain, and/or produce from a source and/or origin.
determine—to find out, obtain, calculate, decide, deduce, ascertain, and/or come to a decision, typically by investigation, reasoning, and/or calculation.
device—a machine, manufacture, and/or collection thereof.
direct—to point, aim, and/or send toward a place or object and/or to cause to move in or follow a predetermined course.

direction—a spatial relation between something and a course along which it points and/or moves; a distance independent relationship between two points in space that specifies the position of either with respect to the other; and/or a relationship by which the alignment and/or orientation of any position with respect to any other position is established.

each—every one of a group considered individually.

edge—a periphery, border, and/or boundary at which a surface terminates.

effective—sufficient to bring about, provoke, elicit, and/or cause.

elevate—to raise in importance, height, and/or relative position.

elongated—drawn out, made spatially longer, and/or having more length than width.

embodiment—an implementation, manifestation, and/or concrete representation.

entrain—to carry along in a current.

estimate—(n) a calculated value approximating an actual value; (v) to calculate and/or determine approximately and/or tentatively.

exemplary—serving as an example, instance, and/or illustration.

extend—to reach spatially outward, stretch, cover, and/or span.

first—a label for a referenced element in one or more patent claims, but that label does not necessarily imply any type of ordering to how that element (or any other elements of a similar type) is implemented in embodiments of the claimed subject matter.

fixed—a stable and/or unalterable form; substantially unchanged over a time period; and/or secured and/or incapable of translating with respect to a related object.

floor—a supporting surface of a structure and/or a lower limit and/or base.

flow—(n) a stream and/or current; (v) to move and/or run smoothly with unbroken continuity, as in the manner characteristic of a fluid.

foil—an elongated solid object with a shape such that, when placed in fluid that is moving with respect to the foil (i.e., the fluid and/or the foil can be moving with respect to a fixed reference point, so long as there is differential movement between the fluid and foil), at a suitable angle of attack the flow of fluid around the foil can produce differential velocities in various streams of that flow, potentially leading to vortices, eddies, and/or a turbulent wake in at least some of those streams, and particularly those streams that pass below the lower surface of the foil.

for—with a purpose of forward—directed toward a point in advance; in a direction in front of; and/or at a position ahead of with respect to a flow direction.

frame—a structure adapted to support and/or contain something.

from—used to indicate a source, origin, and/or location thereof.

further—in addition.

gap—an aperture, break, opening, and/or a space within and/or between objects.

generate—to create, produce, give rise to, and/or bring into existence.

given—known, identified, specified, and/or determined.

handle—a part and/or element adapted to be held, seized, grasped, and/or receive an applied force.

having—including but not limited to.

hold—to grasp in one's hands; to keep and/or maintain the existing state, condition, and/or position of; and/or to put in, keep, and/or maintain in a desired state, condition, and/or position.

hydrodynamic—Of, relating to, or operated by the force of liquid in motion.

including—including but not limited to.

initialize—to prepare something for use and/or some future event.

inlet—an opening providing a means of entrance.

install—to connect or set in position and prepare for use.

integral—formed or united into another entity.

into—toward, in the direction of, and/or to the inside of; and/or to a condition, state, or form of.

is—to exist in actuality.

laminar flow—nonturbulent motion of a fluid in which parallel layers have different velocities relative to each other.

length—a longest dimension of something and/or the measurement of the extent of something along its greatest dimension.

lift—to direct or carry from a lower to a higher position; to raise; and/or to elevate.

longitudinal—of and/or relating to a length; placed and/or running lengthwise.

longitudinal axis—a straight line defined parallel to an object's length and passing through a centroid of the object.

lower—in a low position relative to something else.

maintain—to retain, preserve, sustain, keep in an existing state, and/or continue to obtain.

major—greater than others in scope, size, extent, and/or effect.

may—is allowed and/or permitted to, in at least some embodiments.

method—one or more acts that are performed upon subject matter to be transformed to a different state or thing and/or are tied to a particular apparatus, said one or more acts not a fundamental principal and not preempting all uses of a fundamental principal.

move—to change a position and/or place.

near—a distance of less than approximately [X].

net—an openwork fabric made of threads and/or cords that are woven and/or knotted together at regular intervals and/or a fabric consisting of a uniform open mesh made by weaving, twisting, knotting, crocheting, etc.

no—an absence of and/or lacking any.

non-destructively—to perform substantially without damaging; and/or of, relating to, and/or being a process that does not result in damage to the subject material and/or product and/or results in such minimal damage that the subject material and/or product can be re-used for its intended purpose.

one—being and/or amounting to a single unit, individual, and/or entire thing, item, and/or object.

open—not closed.

operable—practicable and/or fit, ready, and/or configured to be put into its intended use and/or service.

operative—when in operation for its intended use and/or service.

or—a conjunction used to indicate alternatives, typically appearing only before the last item in a group of alternative items.

outside—beyond a range, boundary, and/or limit; and/or not within.

parallel—of, relating to, or designating lines, curves, planes, and/or or surfaces everywhere equidistant.
pass—to move by something and/or to cause to move.
per—for each and/or by means of.
perpendicular—intersecting at or forming substantially right angles.
pivot—to rotate, revolve, and/or turn.
pivotable—capable of pivoting.
plane—a substantially flat surface and/or a surface containing all the straight lines that connect any two points on it.
plurality—the state of being plural and/or more than one.
portion—a part, component, section, percentage, ratio, and/or quantity that is less than a larger whole.
position—(n) a place, orient, and/or location, often relative to a reference point. (v) to put in a place, orientation, position, and/or location.
pre-—a prefix that precedes an activity that has occurred beforehand and/or in advance.
predetermine—to determine, decide, and/or establish in advance.
prevent—to impede, resist, hinder, avert, stop, and/or keep from happening.
prior—before and/or preceding in time or order.
probability—a quantitative representation of a likelihood of an occurrence.
product—something produced by human and/or mechanical effort.
project—to calculate, estimate, or predict.
provide—to furnish, supply, give, and/or make available.
range—a measure of an extent of a set of values and/or an amount and/or extent of variation.
ratio—a relationship between two quantities expressed as a quotient of one divided by the other.
receive—to get as a signal, take, acquire, and/or obtain.
recommend—to suggest, praise, commend, and/or endorse.
reduce—to make and/or become lesser and/or smaller.
remain—to stay in substantially a same location, position, and/or state.
remove—to free, take off, unbind, unfasten, take away, and/or shift or move from one place or position to another.
repeat—to do again and/or perform again.
repeatedly—again and again; repetitively.
request—to express a desire for and/or ask for.
resident—located and/or present.
resilient—elastic and/or capable of regaining its original shape or position after bending, stretching, compression, and/or other deformation.
rest—to not substantially move and/or to be supported by.
result—(n.) an outcome and/or consequence of a particular action, operation, and/or course; (v.) to cause an outcome and/or consequence of a particular action, operation, and/or course.
rotation—an act and/or process of turning around a center and/or an axis.
said—when used in a system or device claim, an article indicating a subsequent claim term that has been previously introduced.
scrape—to rub a surface with an edged device.
second—a label for an element in one or more patent claims, the element other than a "first" referenced element of a similar type, but the label does not necessarily imply any type of ordering to how that "second" element or the "first" element is implemented in embodiments of the claimed subject matter.
select—to make a choice or selection from alternatives.
separate—to disunite, space apart, set apart, and/or keep apart and/or to be positioned intermediate to.
separator—a physical structure that is configured to disunite, space apart, set apart, and/or keep apart and/or to be positioned intermediate to.
set—a related plurality.
simultaneously—happening, existing, and/or done at substantially the same time.
slide—to, in a smooth and/or continuous motion, move one object relative to another.
slider—a device configured to slide.
smooth—free from irregularities, obstructions, impediments, roughness, and/or projections.
species—a class of individuals and/or objects grouped by virtue of their common attributes and assigned a common name; a division subordinate to a genus.
spring—a flexible elastic object, such as a coil of wire, bent bar, coupled set of plates, washer, etc., that regains its original shape after being compressed or extended, is used to store mechanical energy, and is often made of hardened and tempered material, such as steel. Types of springs can include coil springs, helical springs, conical springs, torsion springs, tension springs, compression springs, leaf springs, V-springs, spiral springs, spring washers, gas springs, rubber bands, etc.
store—to place, hold, and/or retain data, typically in a memory.
stream—a flow of water and/or other fluid.
substantially—to a great extent and/or degree.
support—to bear the weight of, especially from below.
surface—the outer boundary of an object and/or a material layer constituting and/or resembling such a boundary.
swimming pool—a structure, often a concrete-lined excavation of rectangular shape, that is filled with water and used for swimming.
system—a collection of mechanisms, devices, machines, articles of manufacture, processes, data, and/or instructions, the collection designed to perform one or more specific functions.
tension—a deformation of an at least partially elastic body.
that—a pronoun used to indicate a thing as indicated, mentioned before, present, and/or well known.
through—across, among, between, and/or in one side and out the opposite and/or another side of
to—a preposition adapted for use for expressing purpose.
touch—(v) to make direct physical contact with.
toward—used to indicate a destination and/or in a physical and/or logical direction of.
transform—to change in measurable: form, appearance, nature, and/or character.
transmit—to send as a signal, provide, furnish, and/or supply.
traverse—to pass and/or travel along, across, over, and/or through.
treatment—an act, manner, or method of handling and/or dealing with someone and/or something.
turbulence—the often haphazard secondary motion caused by eddies within a moving fluid.
turbulent—characterized by turbulence; agitated; and/or churning.
turbulent flow—the motion of a fluid having local velocities and/or pressures that fluctuate randomly or irregularly.

under—below, beneath, and/or in a lower position or place than.

uninterrupted—continuous and/or continuing in space without interruption.

upon—immediately or very soon after; and/or on the occasion of.

upper—in a high position relative to something else.

use—to put into service.

variable—(n) a property, parameter, and/or characteristic capable of assuming any of an associated set of values. (adj) likely to change and/or vary; subject to variation; and/or changeable.

via—by way of and/or utilizing.

water—a transparent, odorless, tasteless liquid containing approximately 11.188 percent hydrogen and approximately 88.812 percent oxygen, by weight, characterized by the chemical formula H2O, and, at standard pressure (approximately 14.7 psia), freezing at approximately 32° F. or 0 C and boiling at approximately 212° F. or 100 C.

water-borne—existing in and/or carried by water.

water container—a receptacle in which water is held, retained, and/or limited in movement, and which typically has an at least partially open top and/or a nondestructively openable top and/or lid, such as a swimming pool, hot tub, fountain, fish pond, bird bath, fish tank, water garden, sump, collection basin, pond, stream, river, etc.

weight—a force with which a body is attracted to Earth or another celestial body, equal to the product of the object's mass and the acceleration of gravity; and/or a factor and/or value assigned to a number in a computation, such as in determining an average, to make the number's effect on the computation reflect its importance, significance, preference, impact, etc.

when—at a time and/or during the time at which.

wherein—in regard to which; and; and/or in addition to.

with—accompanied by.

with regard to—about, regarding, relative to, and/or in relation to.

with respect to—about, regarding, relative to, and/or in relation to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. References herein to "in one embodiment", "in an embodiment", or the like do not necessarily refer to the same embodiment.

Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects any person having ordinary skill in the art, after obtaining authorization from the inventor(s), to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly unsuitable, inoperable, or contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential"; and within, among, and between any described embodiments:

any two or more described substances can be mixed, combined, reacted, separated, and/or segregated;

any described characteristic, function, activity, substance, component, and/or structural element, or any combination thereof, can be specifically included, duplicated, excluded, combined, reordered, reconfigured, integrated, and/or segregated;

any described interrelationship, sequence, and/or dependence between any described characteristics, functions, activities, substances, components, and/or structural elements can be omitted, changed, varied, and/or reordered;

any described activity can be performed manually, semi-automatically, and/or automatically;

any described activity can be repeated, performed by multiple entities, and/or performed in multiple jurisdictions.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all sub-ranges therebetween, such as for example, 1 to 3.65, 2.8 to 8.14, 1.93 to 9, etc., even if those specific values or specific sub-ranges are not explicitly stated.

When any phrase (i.e., one or more words) appearing in a claim is followed by a drawing element number, that drawing element number is exemplary and non-limiting on claim scope.

No claim or claim element of this document is intended to invoke 35 USC 112(f) unless the precise phrase "means for" is followed by a gerund.

Any information in any material (e.g., a United States patent, United States patent application, book, article, web page, etc.) that has been incorporated by reference herein, is incorporated by reference herein in its entirety to its fullest enabling extent permitted by law yet only to the extent that no conflict exists between such information and the other definitions, statements, and/or drawings set forth herein. In the event of such conflict, including a conflict that would render invalid any claim herein or seeking priority hereto, then any such conflicting information in such material is specifically not incorporated by reference herein. Any specific information in any portion of any material that has been incorporated by reference herein that identifies, criticizes, or compares to any prior art is not incorporated by reference herein.

Applicant intends that each claim presented herein and at any point during the prosecution of this application, and in any application that claims priority hereto, defines a distinct patentable invention and that the scope of that invention must change commensurately if and as the scope of that claim changes during its prosecution. Thus, within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document when reasonably interpreted by a person having ordinary skill in the relevant art.

What is claimed is:

1. A water cleaner, comprising:
   a handle;
   a collection net configured to operatively collect debris resident in water of a water container;
   a frame configured to attach to the handle and to operatively and substantially hold open a major inlet of the net;
   a collection blade integral to or attached to a bottom edge of the frame, the collection blade configured to operatively traverse along and/or adjacent to a floor of the water container; and
   a hydrodynamic assembly configured to be attached to the frame, the hydrodynamic assembly comprising:
      an elongated hydrodynamic lift blade that defines a hydrodynamic lift blade longitudinal axis, a length, a substantially smooth upper surface, and a substantially smooth lower surface;
      at least one arm configured to operatively attach the hydrodynamic lift blade to the frame, the water cleaner configured to operatively resiliently bias the hydrodynamic lift blade toward the floor; and
      the water cleaner configured to operatively define a gap between the hydrodynamic lift blade and the floor, the gap extending uninterrupted for at least 50 percent of the length of the hydrodynamic lift blade.

2. The water cleaner of claim 1, further comprising:
   at least one separator configured to operatively separate the hydrodynamic lift blade from the floor of the water container.

3. The water cleaner of claim 1, further comprising:
   at least one separator configured to operatively separate the hydrodynamic lift blade from the floor of the water container and to operatively slide along the floor of the water container and to define the gap.

4. The water cleaner of claim 1, further comprising:
   at least one separator configured to operatively separate the hydrodynamic lift blade from the floor of the water container and to operatively roll along the floor of the water container and to define the gap.

5. The water cleaner of claim 1, wherein:
   the hydrodynamic lift blade is configured to cause substantially turbulent flow in a flow stream that passes substantially below the hydrodynamic lift blade when the water cleaner moves in a direction that is substantially parallel to a plane of the floor of the water container.

6. The water cleaner of claim 1, wherein:
   the hydrodynamic lift blade is configured to maintain substantially laminar flow in a flow stream that passes substantially above the hydrodynamic lift blade when the water cleaner moves in a direction that is substantially parallel to a plane of the floor of the water container.

7. The water cleaner of claim 1, wherein:
   the hydrodynamic lift blade is configured to operatively entrain in a net-bound flow stream debris resting on the floor of the water container without touching that debris.

8. The water cleaner of claim 1, wherein:
   the hydrodynamic lift blade is configured to operatively direct debris into the collection net without touching that debris.

9. The water cleaner of claim 1, wherein:
   the collection blade is configured to substantially prevent debris entrained in a net-bound flow stream by the hydrodynamic lift blade from flowing under the net when the water cleaner moves in a direction that is substantially parallel to a plane of the floor of the water container.

10. The water cleaner of claim 1, wherein:
    the hydrodynamic assembly is configured to non-destructively removeably attach to the frame.

11. The water cleaner of claim 1, wherein:
    the at least one arm is configured to non-destructively releaseably attach to the frame.

12. The water cleaner of claim 1, wherein:
    a longitudinal cross-section of the hydrodynamic lift blade is hydrofoil-shaped.

13. The water cleaner of claim 1, wherein:
the at least one separator is integral to or attached to the at least one arm.

14. The water cleaner of claim 1, wherein:
the at least one separator is integral to or attached to the hydrodynamic lift blade.

15. The water cleaner of claim 1, wherein:
the water cleaner operatively biases the hydrodynamic lift blade toward the frame.

16. The water cleaner of claim 1, wherein:
a position of the hydrodynamic lift blade with respect to the collection blade is operatively variable.

17. A water cleaner, comprising:
a handle;
a collection net configured to operatively collect debris resident in water of a water container;
a frame configured to attach to the handle and to operatively hold substantially open a primary inlet of the net;
a collection blade integral to or attached to a bottom edge of the frame, the collection blade configured to operatively traverse along and/or adjacent to a floor of the water container; and
a hydrodynamic lift assembly configured to be attached to the frame, the hydrodynamic lift assembly comprising:
an elongated hydrodynamic lift blade that defines a hydrodynamic lift blade longitudinal axis;
at least one arm configured to operatively attach the hydrodynamic lift blade to the frame; and
at least one separator configured to operatively prevent direct contact between the hydrodynamic lift blade and the floor and between the hydrodynamic lift blade and debris supported by the floor.

18. The water cleaner of claim 17, wherein:
the hydrodynamic lift blade is configured to operatively cause substantially turbulent flow in a flow stream that passes substantially below the hydrodynamic lift blade when the water cleaner moves in a direction that is substantially parallel to a plane of the floor of the water container.

19. The water cleaner of claim 17, wherein:
the at least one arm is configured to operatively remain in a fixed position with respect to the frame.

20. The water cleaner of claim 17, wherein:
the hydrodynamic lift blade is configured to operatively remain in a fixed position with respect to the frame.

21. A water debris entrainment assembly configured to be attached to a frame of a net device that is configured to collect debris from water in a water container, the net device comprising a collection blade configured to scrape a floor of the water container, the assembly comprising an elongated hydrodynamic lift blade that defines a hydrodynamic lift blade longitudinal axis, the hydrodynamic lift blade operatively configured to:
be located forward of the collection blade with respect to operative movement of the net device;
define an uninterrupted gap between itself and the floor of at least 0.2 inches along at least 70% of the length of hydrodynamic lift blade when the collection blade is in contact with the floor; and
direct debris into the collection net without touching that debris.

22. The water cleaner of claim 17, wherein:
the hydrodynamic lift blade is operatively configured to simultaneously cause, when the collection blade is in contact with and moves along the floor, substantially turbulent flow in a first flow stream that passes below the hydrodynamic lift blade and substantially laminar flow in a second flow stream that passes above an upper surface of the hydrodynamic lift blade.

* * * * *